E. E. WICKERSHAM.
STEERING MECHANISM FOR TRACTORS.
APPLICATION FILED OCT. 17, 1918.
1,356,680.
Patented Oct. 26, 1920.
2 SHEETS—SHEET 1.
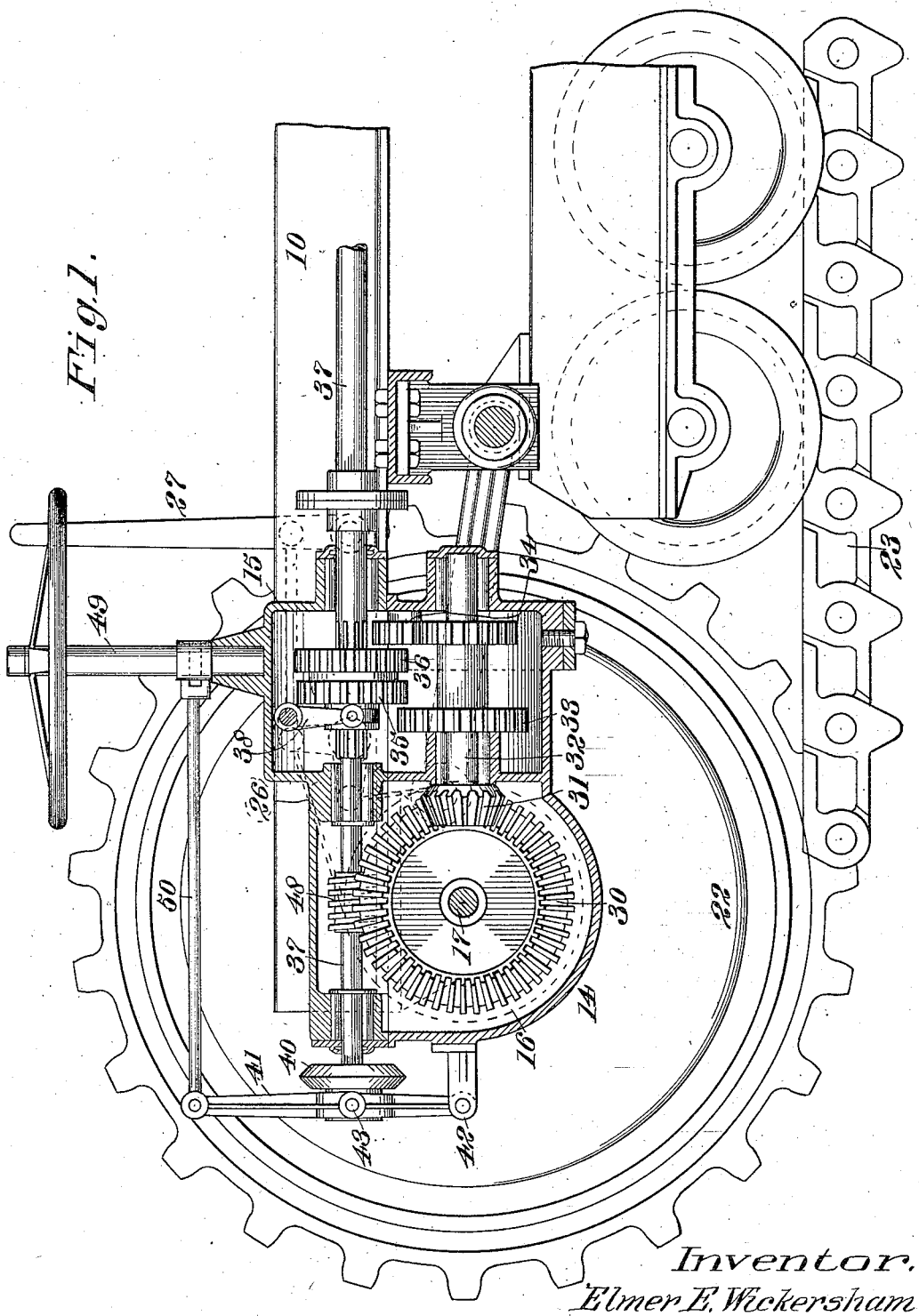
Inventor.
Elmer E. Wickersham
By Strong & Townsend
Attys

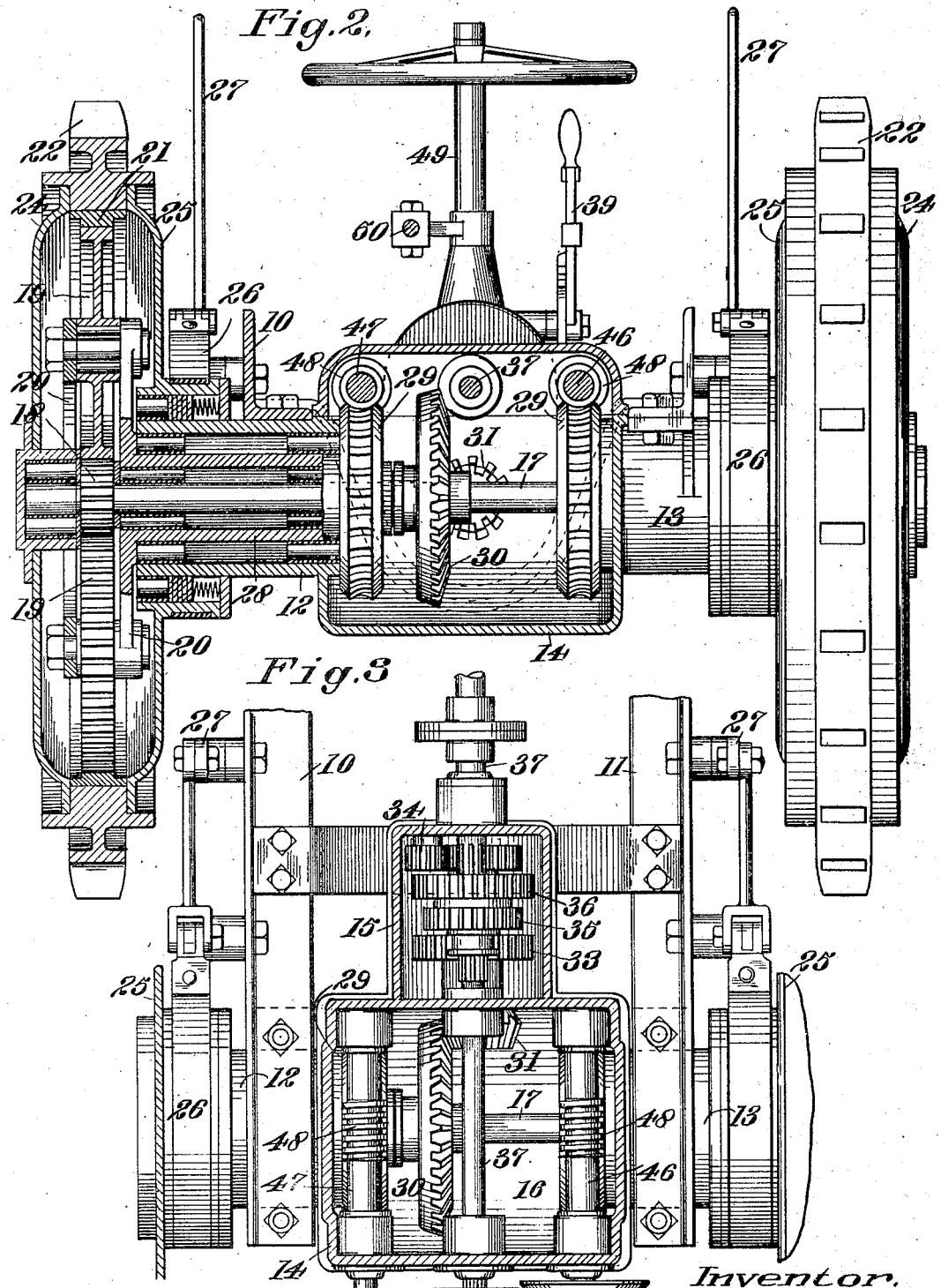

UNITED STATES PATENT OFFICE.

ELMER E. WICKERSHAM, OF STOCKTON, CALIFORNIA, ASSIGNOR TO THE HOLT MANUFACTURING COMPANY, OF STOCKTON, CALIFORNIA, A CORPORATION OF CALIFORNIA.

STEERING MECHANISM FOR TRACTORS.

1,356,680.   Specification of Letters Patent.   Patented Oct. 26, 1920.

Application filed October 17, 1918. Serial No. 258,541.

*To all whom it may concern:*

Be it known that I, ELMER E. WICKERSHAM, a citizen of the United States, residing at Stockton, in the county of San Joaquin and State of California, have invented a new and useful Improvement in Steering Mechanism for Tractors, of which the following is a specification.

This invention relates to a power transmission for motor vehicles, and particularly pertains to a speed changing and steering mechanism for tractors.

It is the principal object of this invention to provide a simply controlled mechanism for driving the separate traction elements of a motor vehicle and to thus effect a steering of the vehicle by the relative variation in the speeds of operation of the two traction elements, the present invention being similar in result to that shown by the structure shown in my copending application filed Sept. 18th, 1918 Serial No. 254600.

In the present instance, however, the structure is simplified to merely incorporate means for alternately accelerating the speeds of the separate transmission units.

In carrying out the present invention I contemplate the use of a multiple speed gear set, a driving axle in communication therewith, planetary gear mechanisms separately driven by the axle and incorporated within the two driving units and power driven means adapted to be alternately controlled to effect the different gear mechanisms and thereby vary the speed of the traction unit affected in relation to the normal speed of the vehicle.

The invention is illustrated in the accompanying drawings, in which—

Figure 1 is a side elevation, with parts broken away to disclose the rear portion of one of the tractor units and a part of the power transmission mechanism.

Fig. 2 is a view in vertical section taken centrally of the rear driving axle of the transmission mechanisms.

Fig. 3 is a view in plan with parts broken away to clearly disclose the control mechanism of the steering members.

Referring to the drawings, 10 and 11 indicate the parallel side bars of the vehicle frame. To these bars are fixed tubular transmission sleeves 12 and 13 formed integral with the opposite sides of a transmission gear case 14. This case has two compartments, a forward compartment 15 within which a set of speed changing gears is positioned, and a rear compartment 16 within which the steering shafts and the driving gear of the rear axle 17 are positioned.

The axle 17 extends through the sleeves 12 and 13 and is fitted at its opposite ends with driving pinions 18. These pinions are in constant mesh with oppositely disposed planetary gears 19 carried by planetary gear spiders 20. The pinions 18 are also in constant mesh with a circumscribing ring gear 21, which, in the present instance, is shown as fixed within the drum of a driving sprocket wheel 22. One of these wheels is disposed, as will be understood, at each end of the axle and affords a final drive for a link traction chain 23, as indicated in Fig. 1.

These sprockets are provided with opposite side plates 24 and 25. The outer of these plates carries central hubs within which roller bearings are positioned to rotatably support the outer ends of the axle 17. The inner plate 25 is provided with an enlarged hub which circumscribes the transmission portions 12 and 13 and is rotatably supported thereupon by roller bearings. These enlarged hubs of the side plates 25 also provide braking surfaces around which band brakes 26 are disposed. Levers 27 connect with the bands of these brakes and allow them to be separately actuated to retard the rotation of the separate sprockets.

Telescoping into the transmission sleeves are tubular hubs 28 which form a part of the planetary gear spiders 20. These hubs are independently supported for a rotatable motion around the axle 17 and are further provided with anti-friction bearings to support them within the sleeves of the transmission. The inner ends of these hubs carry worm gears 29, one of which is fixed to each hub 28 for a purpose which will be hereinafter set forth. The bevel gear 30 is in constant mesh with the bevel pinion 31 carried by the counter-shaft 32. This shaft extends forwardly through the compartment 15 and is shown in Fig. 1 as being fitted with fixed speed changing gears 33 and 34. These gears may be brought to mesh with sliding gears 35 and 36 carried by the propeller shaft 37, all of said gears being within the compartment 15. The gears 35 and 36 are controlled by a shifting yoke 38, suitably connected with a shifting lever 39.

The propeller shaft 37 is extended through the partition wall between compartments 15 and 16, across the compartment 16 and out through the bearing in the rear of the transmission case. This terminating portion of the propeller shaft is provided with a double faced friction disk 40. This disk is splined to the end of the shaft and may be reciprocated therealong by a shifting lever 41 pivotally mounted to a bracket 42 which extends from the rear of the transmission case. The shifting lever 41 has yoke-carrying pins 43 which engage an annular groove in the hub of the disk. The friction member 40 has opposite bevel faces, one of which may be brought to bear against a cone-shaped friction disk 44, while the other may be brought to engage a similar disk 45 disposed upon the diametrically opposite side from the disk 44. The disk 44 is fixed to the rear end of a steering shaft 46. This shaft is parallel to the propeller shaft 37 and extends along one side thereof. The disk 45 is fixed to the rearwardly projecting end of the second steering shaft 47 disposed in a similar relation to the propeller shaft as the shaft 46 and upon the opposite side of the transmission therefrom. Each of these steering shafts is provided with a worm gear 48 in constant mesh with complementary worm wheels 29 carried by the sleeves of the gear spiders.

In the operation of the present invention the propeller shaft is set in rotation by a suitable source of power and will thereafter impart driving motion to the counter-shaft 32 when certain of the gears 33, 34, 35 and 36 are in engagement. This action will drive the rear axle 17 through the pinion 31 and the gear 30. Rotation of the rear axle 17 will impart rotation to the gears 18 at its opposite ends, and, under normal conditions, will cause these gears to drive the gears 19 to produce a rotation of the sprockets 22 through engagement of the gears 19 with the gears 21. In this condition the gear spiders 20 and their sleeves will be locked against rotation. When it is desired to guide the vehicle from its straight course of travel the steering shaft 49 may be rotated to actuate the shifting lever 41 through a connecting rod 50. If the shifting lever is drawn forwardly the friction disk 40 will be brought to engage the disk 44, and as the disk 40 is in constant rotation, rotation will thus be imparted to the shaft 46. This will apply power to the sleeve 28 of the gear spider 20 upon that side of the machine and will produce a backward rotation of the gear spider while the gears carried thereon are being rotated forwardly by the gear 18. This will decrease the resultant speed of the sprocket 22 driven thereby, and, as the opposite sprocket is continuing at its original rate of speed, will cause the vehicle to turn toward the side of the road corresponding to the retarded sprocket. The reverse sliding movement of the disk 40 will cause engagement between this disk and the friction member 45, thus producing the same action as previously described between the shaft 47 and the corresponding spider 20.

It will thus be seen that by reciprocation of the disk 40 to bring it into separate engagement with the disks 44 and 45 the vehicle may be turned to either side of the roadway and may be made to pursue any desired arc of travel, depending entirely upon the frictional contact between the disks.

Having thus described my invention, what I claim and desire to secure by Letters Patent is:

1. In a power transmission mechanism, a drive shaft, a driving axle rotated thereby, driving pinions fixed to the opposite ends of the axle, planetary gears in mesh with said pinions, gear spiders circumscribing the axle and supporting said gears, ring gears in mesh with the planetary gears, worm wheels fixed to each of said spiders, complementary worm gears in mesh with said wheels and unitary means for alternately but not simultaneously rotating either of said gears to produce rotation of the spider corresponding thereto.

2. In a power transmission mechanism, a drive shaft, a driving axle rotated thereby, driving pinions fixed to the opposite ends of the axle, planetary gears in mesh with said pinions, gear spiders circumscribing the axle and supporting said gears, ring gears in mesh with the planetary gears, worm wheels fixed to each of said spiders, complementary worm gears in mesh with said wheels, power transmission means carried by the shaft of each worm gear and a sliding transmission member upon the main shaft adapted to be alternately brought to engage said transmission means to produce corresponding rotation of the spider affected thereby.

3. In a power transmission mechanism, a drive shaft, a driving axle rotated thereby, driving pinions fixed to the opposite ends of the axle, planetary gears in mesh with said pinions, gear spiders circumscribing the axle and supporting said gears, ring gears in mesh with the planetary gears, worm wheels fixed to each of said spiders, complementary worm gears in mesh with said wheels, power transmission means carried by the shaft of each worm gear and a friction disk slidably mounted upon the main shaft and splined thereto, said disk being controlled to alternately engage said transmission members and impart motion thereto.

In testimony whereof I have hereunto set my hand in the presence of two subscribing witnesses.

ELMER E. WICKERSHAM.

Witnesses:
 E. O. BOQUIST,
 J. G. SMITH.